July 26, 1966 J. C. ALBRIGHT 3,263,159

METHOD AND APPARATUS FOR RECORDING AND REPRODUCING ANALOG F.M. DATA WITHOUT DISTORTION

Filed Oct. 26, 1962 2 Sheets-Sheet 1

INVENTOR.
JAMES C. ALBRIGHT

BY William J. [signature]

ATTORNEY

INVENTOR.
JAMES C. ALBRIGHT

BY William J. Miller

ATTORNEY 3,263,159

METHOD AND APPARATUS FOR RECORDING AND REPRODUCING ANALOG FM DATA WITHOUT DISTORTION

James C. Albright, Ponca City, Okla., assignor to Continental Oil Company, Ponca City, Okla., a corporation of Oklahoma Filed Oct. 26, 1962, Ser. No. 233,349
18 Claims. (Cl. 324—1)

Figure 1:
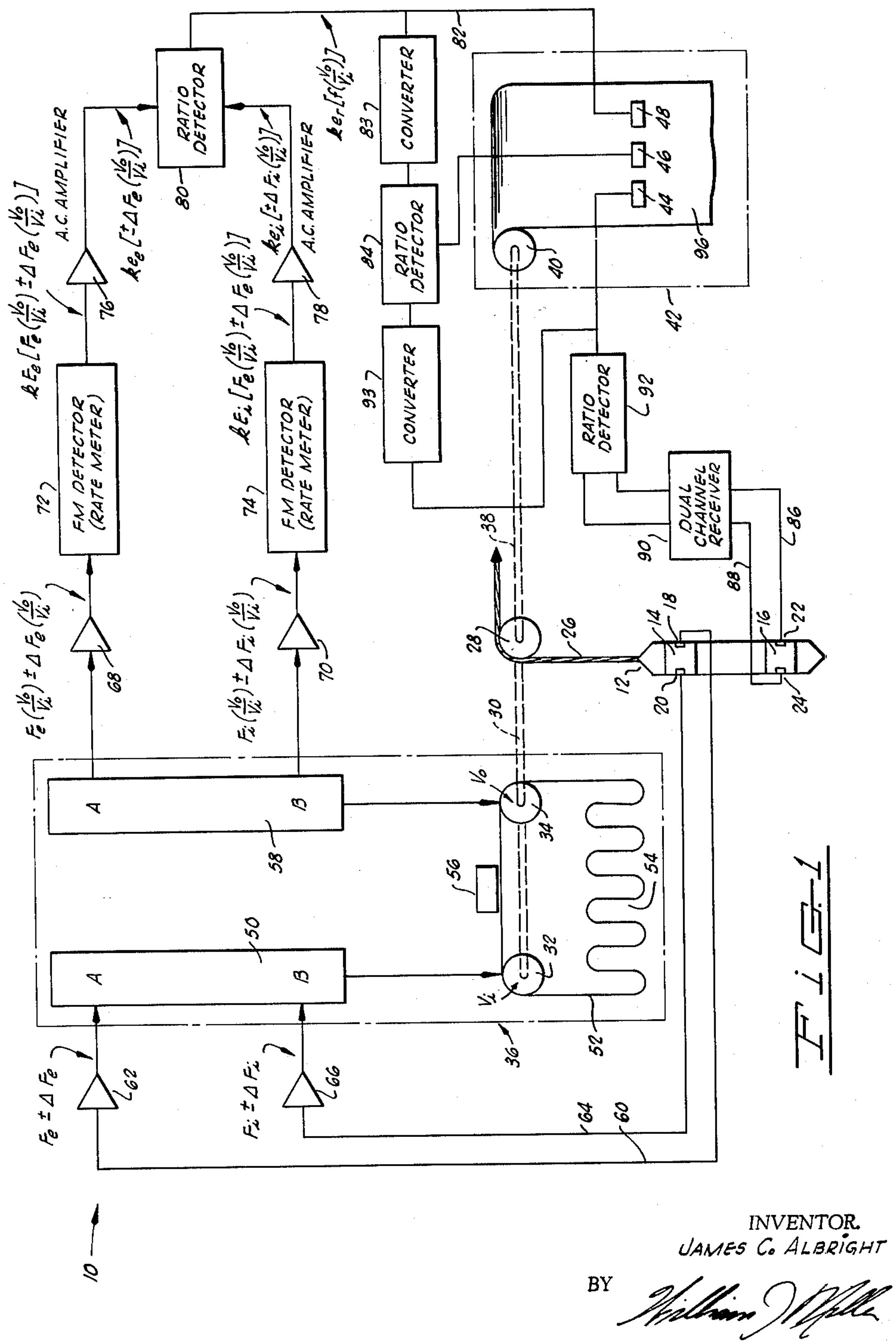

The present invention relates to method and apparatus for recording and reproducing a frequency modulated signal without distortion of analog data carried by the signal due to variations in the velocities of the recording and playback device, and more particularly, but not by way of limitation, relates to a method and apparatus for correlating frequency modulated data signals from a well logging tool having a plurality of vertically spaced sondes.

As is well known in the electronic art, a frequency modulated (FM) signal is an alternating current (A.C.) signal having a variable frequency which is representative of data which is then said to be carried by the signal. The FM signal may be mathematically comprised of a center frequency F plus variations above and below this center frequency which may be represented by the expression $\pm\Delta F$. The magnitude of the data carried by the FM signal is usually a function of the magnitude of the $\pm\Delta F$ term and the rate or frequency at which the $\pm\Delta F$ term changes from positive to negative determines the frequency of the data, particularly in the case of audio and the like.

As is also well known in the art, whenever an FM signal is recorded on a magnetic tape by moving the magnetic tape past a recording head, it is essential that the tape be moved past a reproducing head at the same velocity in order for the FM signal and the data carried thereby to be accurately reproduced. Otherwise the instantaneous frequency of the FM signal will be changed by the velocity factor term $Vo/Vi$ where $Vi$ is the velocity at which the tape moves past the recording head and $Vo$ is the velocity of the tape as it passes the reproducing head. Obviously, such a change in the instantaneous frequency of the FM signal results in a change in both the center frequency term F and the modulation term $\pm\Delta F$. Further, it will be noted that the modulation term will be distorted both with respect to its maximum value and to the rate or frequency at which it varies above and below the center frequency. Therefore, analog data repsented only by the magnitude of the modulation term $\pm\Delta F$ which varies at a constant frequency of 200 c.p.s., for example, will be increased when the velocity ratio is greater than one and reduced when the velocity ratio is less than one. Of course, the frequency of the $\pm\Delta F$ term will also be varied by the same velocity ratio.

Accordingly, it will be evident that there are many applications in the field of telemetry, for example, where it is highly desirable to be able to reproduce an FM signal without the necessity of accurately controlling the velocity of the tape or other recording medium during recordation and reproduction of the signal.

One application where it is virtually essential to be able to record and reproduce an FM signal at different recording velocities occurs in the novel and highly useful method of logging well bores described in copending U.S. patent application Serial No. 11,197, filed on Feb. 26, 1960, now Patent No. 3,075,142, and assigned to the assignee of the present invention. The method described in the above referenced application entails the use of a well logging tool having two vertically spaced measuring probes or sondes. Therefore, as the tool is withdrawn from the well bore on a logging run, the upper sonde will pass each formation a short time before the lower sonde. In order to correlate the signal from the two sondes with respect to a common depth in the well bore, it is necessary to delay the signal from the upper sonde a period of time equal to the time required for the lower sonde to travel upwardly to the same point. The time delay problem is greatly complicated by the fact that the logging tool cannot, as a practical matter, be withdrawn at a constant rate and therefore the recording device must be geared to the travel of the logging tool in order to correlate the data with the proper depth.

The method of well logging disclosed in the above referenced application is concerned with measuring the resistivity of the formations adjacent the well bore in order to determine the presence of hydrocarbons. This is accomplished by applying a potenial across the formation and then measuring the current density flowing through a portion of the formation and the potential which causes the measured current density. Both of these measurements are made by each of the two vertically spaced sondes on the logging tool and are telemetered to the surface as analog data carried by separate FM signals, such that four separate FM signals are transmitted to the surface. At the surface the two FM signals from the upper sonde are divided in accordance with Ohm's law to produce the resistivity of the formation. Then the resistivity measurement is delayed a period of time sufficient for the lower sonde to travel upwardly to the point of measurement and is then recorded in synchronism with the data produced by dividing the two FM signals from the lower sonde. The data from each of the two vertically spaced sondes will then be correlated with respect to a common depth and if desired can be divided to produce a ratio of the resistance remote from the well bore to the resistance near the well bore for the purposes set forth in the above referenced application.

Perhaps the most obvious method for delaying the data from the upper sonde until the lower sonde has reached the same measurement point is to record and then reproduce the data after the desired time delay. However, since the time delay is continually variable due to the inability to withdraw the logging tool at a constant velocity, the exact time delay can be produced only by synchronizing the movement of the recording medium, such as a magnetic tape, with the travel of the logging tool. Therefore, it is highly probable that the velocity of the tape during recordation will be different from its velocity during reproduction. Thus it will be evident that some means must be devised for conveniently recording and reproducing the data accurately without regard to the velocity of the magnetic tape during recordation and reproduction.

Therefore, it is contemplated by the present invention, in its more basic aspects, to provide a method and apparatus for accurately recording and reproducing a frequency modulated data signal without distorting the data carried by the signal. The present invention also contemplates the application of the basic concepts to a novel method and apparatus for logging data telemetered from two vertically spaced sondes on a common well logging tool so as to correlate the data with respect to depth. The method may be summarily described, without intending to limit the invention in any way, as comprising the steps of simultaneously recording the FM data signal and an FM reference signal by synchronously moving a pair of recording media past a pair of recording heads at an input velocity $Vi$, simultaneously reproducing the FM data signal and the FM reference signal by synchronously moving the pair of recording media past a pair of reproducing heads at an output velocity $Vo$ such that the reproduced FM data signal and FM reference signal will be equal to the respective recorded signals multiplied by the velocity factor $Vo/Vi$, demodulating each of the reproduced FM signals to produce demodulated electrical signals representative of the data carried by each of the original FM data signals multiplied by the velocity factor $Vo/Vi$, and then dividing one of the signals by the other to eliminate the velocity factor and thereby provide an electrical signal proportional to the data carried by the FM data signal. When a single FM data signal is to be recorded and reproduced, the FM reference signal may conveniently carry a constant magnitude signal representing unit value. Then upon division of the demodulated data signal by the demodulated reference signal of unit value, the resulting signal will be in direct proportion to the original data carried by the original FM signal. The present invention also contemplates novel apparatus for carrying out the novel method of the present invention, as will be fully disclosed in the specification which follows.

As mentioned, the present invention also contemplates a novel method and apparatus for well logging using two vertically spaced sondes each of which makes current and voltage measurements of the formation, one sonde being designed to measure those values of the formation near the well bore and the other to measure those values of the formation remote from the well bore. In accordance with the novel method of well logging, the current and voltage data signals from the upper sonde are recorded in the same manner as FM data signals and the FM reference signals described above. The two signals are then reproduced after the synchronized time delay, demodulated and divided to simultaneously eliminate distortion due to the velocity factor, and simultaneously produce the desired resistivity value. The present invention also contemplates novel well logging apparatus for performing the method, as will be hereafter described in greater detail, and in particular contemplates two embodiments for demodulating the reproduced FM data and FM reference signals.

Therefore, it is an important object of the present invention to provide a method and an apparatus for recording and reproducing an FM data signal without distortion of the data carried by the signal due to variations in the velocity of the recording medium during recordation and reproduction.

Another object of the present invention is to provide a method and apparatus for delaying an FM data signal for a variable period of time without distorting the data.

Still another object of the present invention is to provide a method and an apparatus for correlating with respect to depth FM telemetry signals from two vertically spaced sondes of a single well logging tool without distorting the data carried by the signals.

Still another object of the present invention is to provide apparatus of the type described which is simple in construction, accurate and reliable in operation.

Figure 2:
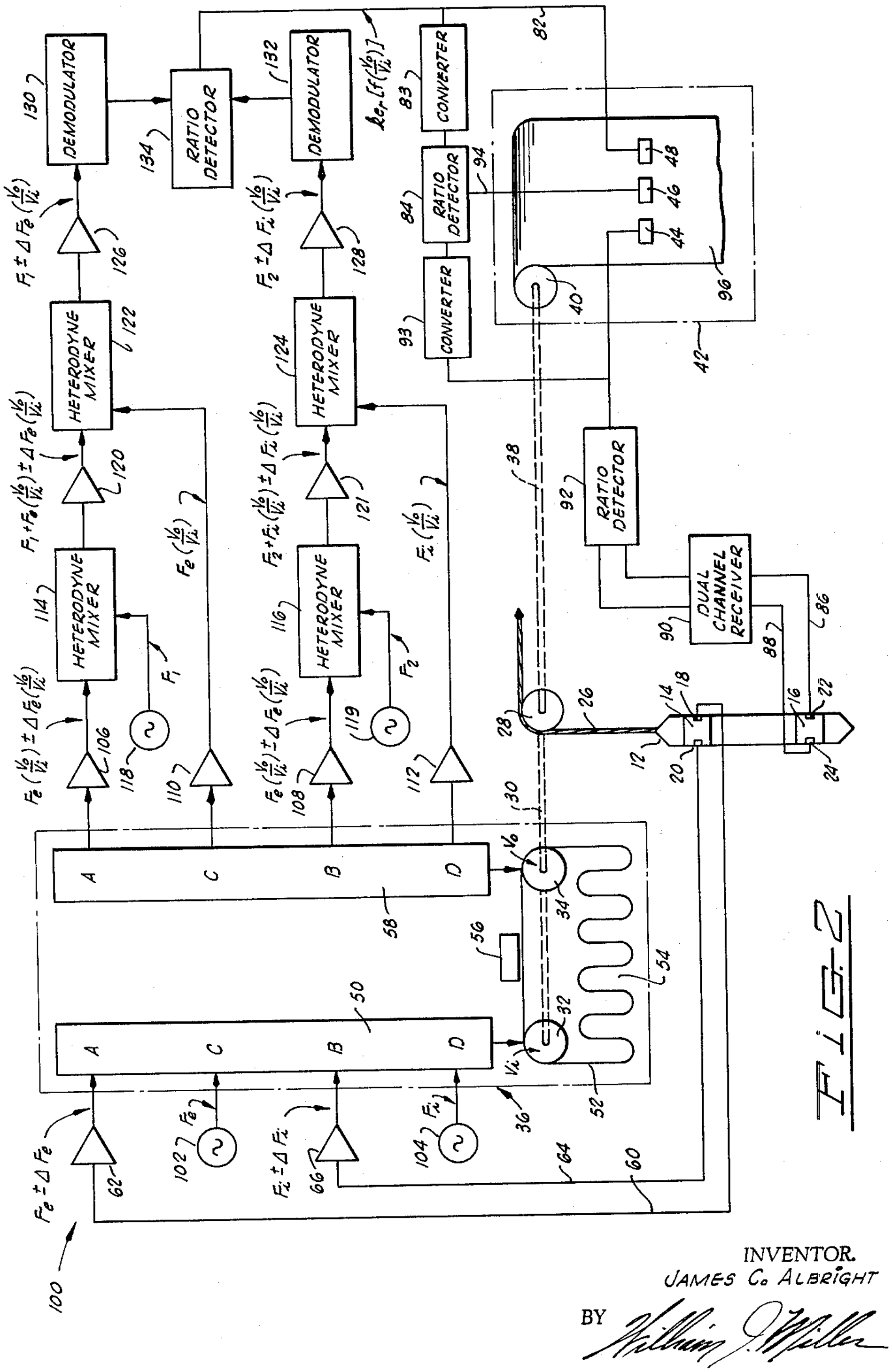

Many additional objects and advantages of the present invention will be evident to those skilled in the art from the following detailed description and drawings, wherein:

FIG. 1 is a schematic and circuit diagram of a well logging apparatus constructed in accordance with the present invention; and, FIG. 2 is a schematic and circuit diagram of a second embodiment of the well logging apparatus constructed in accordance with the present invention.

Assume now that it is desired to reproduce an FM data signal which carries analog data expressed in terms of frequency deviations or excursions from a center frequency. The FM data signal can then be represented by the expression:

$$F_d \pm \Delta F_d \quad (1)$$

wherein $F_d$ is the center frequency and $\pm\Delta F_d$ represents the modulation term or the variations of the frequency above and below the center frequency. Assume also that the rate or frequency at which the modulations vary above and below the center frequency is constant, such as for example 200 c.p.s., so that the only variable is the magnitude of the variations which are representative of the analog data. In accordance with the method of the present invention, the FM data signal is simultaneously recorded with a similar FM reference signal which may be represented by the expression:

$$F_r \pm \Delta F_r \quad (2)$$

wherein $F_r$ is the center frequency and $\pm\Delta F_r$ is representative of the modulations. The FM reference signal is preferably of constant, unitary value, for purposes hereafter described in greater detail, such that the magnitude of the $\pm\Delta F$ term is constant and will vary at the same rate as the FM data signal, which was assumed to be 200 c.p.s.

The FM data signal and the FM reference signal are simultaneously recorded upon a suitable recording medium, such as a magnetic tape, which is moved past a recording head at an input velocity $Vi$. The two signals are simultaneously reproduced by moving the magnetic tape past a reproducing head at an output velocity $Vo$. Then the FM data signal and the FM reference signal will both be modulated by a velocity factor equal to the ratio between the output velocity and the input velocity such that the reproduced signals can then be represented by the expressions:

$$F_d\left(\frac{Vo}{Vi}\right) \pm \Delta F_d\left(\frac{Vo}{Vi}\right) \quad (3)$$

$$Fr\left(\frac{Vo}{Vi}\right) \pm \Delta Fr\left(\frac{Vo}{Vi}\right) \quad (4)$$

The reproduced FM data signal, as defined by Expression 3, and the reproduced reference signal, as defined by Expression 4, are then demodulated to produce a pair of A.C. signals which may be defined by the expressions:

$$ke_d(\pm\Delta F_d)\left(\frac{Vo}{Vi}\right) \quad (5)$$

$$ke_r(\pm\Delta F_r)\left(\frac{Vo}{Vi}\right) \quad (6)$$

wherein $k$ is a proportionality constant and $e_d$ represents an A.C. voltage which will have a frequency of 200 c.p.s. times the velocity factor $Vo/Vi$, and a peak magnitude proportional to the maximum excursions of the FM data signal from the center frequency $F_d$, and $e_r$ is an A.C. voltage having the same frequency of 200 c.p.s. times the velocity factor $Vo/Vi$ and a peak magnitude proportional to the peak magnitude of $\Delta F_r$ times the velocity factor $Vo/Vi$. Further, if the FM data signal and the FM reference signal were in-phase during recordation, the demodulated data signal $e_d$ and the demodulated reference signal $e_r$ will continue to be of the same frequency and also be in-phase.

Next the demodulated data signal as represented by Expression 5 is divided by the demodulated reference signal as represented by Expression 6 to produce a quotient signal as follows:

$$\frac{ke_d(\pm\Delta F_d)\left(\frac{Vo}{Vi}\right)}{ke_r(\pm\Delta F_r)\left(\frac{Vo}{Vi}\right)} = Ke_q(\pm\Delta F_d) \quad (7)$$

It will be noted that upon division of the two demodulated signals, the velocity factor $Vo/Vi$ is cancelled insofar as the peak voltage of the data signal $e_d$ is concerned, and the peak voltage of the quotient A.C. signal $e_q$ is proportional, as represented by the proportionality constant $k$, to the magnitude of the analog data carried by the FM data signal without distortion by the velocity factor. In this respect, it will be appreciated that the constant value of the data carried by the FM reference signal is preferably selected well below the magnitude of the data carried by the FM data signal such that the reference signal may serve as a unit value and the proportionality constant $k$ will not be appreciably less than one. However, it will be appreciated that regardless of the magnitude of the data carried by the reference signal, the resulting signal of Expression 7 will be a true proportional representation of the analog data carried by the FM data signal without distortion. It will, however, be appreciated that the frequency of the signal will be distorted by the velocity factor.

The present invention contemplates two different methods for demodulating the reproduced FM data signal and the FM reference signal as defined by Expressions 3 and 4, respectively, to produce the demodulated data and reference signals defined by Expressions 5 and 6, respectively. In the first method, the reproduced FM data signal and reproduced FM reference signal are converted, by suitable FM detector means, to produce fluctuating D.C. voltages having instantaneous values proportional to the instantaneous frequencies of the reproduced FM data signal and the reproduced FM reference signal. The D.C. voltages may then be expressed as:

$$KE_d(F_d \pm \Delta F_d)\left(\frac{Vo}{Vi}\right) \quad (8)$$

$$KE_r(F_r \pm \Delta F_r)\left(\frac{Vo}{Vi}\right) \quad (9)$$

wherein $E_d$ and $E_r$ are representative of the magnitudes of the respective signals and $k$ is a proportionality constant. The D.C. voltages $E_d$ and $E_r$ are then converted to A.C. voltages to eliminate those portions of the two D.C. voltages which are produced by the center frequencies $F_d$ and $F_r$. The A.C. voltages may then be represented by the expressions:

$$ke_d(\pm \Delta F_d)\left(\frac{Vo}{Vi}\right) \quad (10)$$

$$ke_r(\pm \Delta F_r)\left(\frac{Vo}{Vi}\right) \quad (11)$$

which, it will be noted, are identical to Expressions 5 and 6 and in which the magnitude of the A.C. voltages are proportional to the frequency modulation terms $\pm\Delta F_d$ and $\pm\Delta F_r$ multiplied by the velocity factor $Vo/Vi$.

The second method of demodulating the reproduced FM data signal and the reproduced FM reference signal entails what appears to be a more complicated procedure, but which under the present state of the art requires less complicated, less expensive and more reliable equipment. In the second method of demodulating the reproduced signals, two separate FM center frequency signals having constant frequencies equal to the center frequencies $F_d$ and $F_r$ of the FM data signal and the FM reference signal, respectively, are recorded on the magnetic tape simultaneously with the data and reference signals and are also reproduced simultaneously with the data and reference signals such that the reproduced signals will be modulated by the same velocity factor $Vo/Vi$. The two signals may then be represented by the expressions:

$$F_d\left(\frac{Vo}{Vi}\right) \quad (12)$$

$$F_r\left(\frac{Vo}{Vi}\right) \quad (13)$$

Further, the demodulation method entails the use of two additional constant frequency signals $F_1$ and $F_2$ which are to be used in the following manner.

After the FM data signal, the FM reference signal and the FM center frequency signals are reproduced to provide the signals as defined in Expressions 3, 4, 12 and 13, the FM data signal and FM reference signal are mixed with the constant frequency signals $F_1$ and $F_2$, respectively, by superheterodyne techniques. The beat frequency which is the sum of the two mixed signals is then filtered out to produce sum beat frequency signals which can be represented, respectively, by the expressions:

$$F_1+F_d\left(\frac{Vo}{Vi}\right)\pm\Delta F_d\left(\frac{Vo}{Vi}\right) \quad (14)$$

$$F_2+F_r\left(\frac{Vo}{Vi}\right)\pm\Delta F_r\left(\frac{Vo}{Vi}\right) \quad (15)$$

Next the filtered sum beat frequency signals defined by Expressions 14 and 15 are mixed with the reproduced center frequency signals defined by Expressions 12 and 13, respectively, and the difference beat frequencies filtered out in each case to produce difference beat frequency signals defined by the expressions:

$$F_1+F_d\left(\frac{Vo}{Vi}\right)\pm\Delta F_d\left(\frac{Vo}{Vi}\right)-F_d\left(\frac{Vo}{Vi}\right)=F_1\pm\Delta F_d\left(\frac{Vo}{Vi}\right) \quad (16)$$

$$F_2+F_r\left(\frac{Vo}{Vi}\right)\pm\Delta F_r\left(\frac{Vo}{Vi}\right)-F_r\left(\frac{Vo}{Vi}\right)=F_2\pm\Delta F_r\left(\frac{Vo}{Vi}\right) \quad (17)$$

It will be noted that when the difference beat frequencies are filtered out, the distorted center frequency term $$F_d\left(\frac{Vo}{Vi}\right)$$

cancels out of Expression 16, and similarly the distorted center frequency term $$F_r\left(\frac{Vo}{Vi}\right)$$

cancels out of Expression 17. Then by demodulating the signals represented by Expressions 16 and 17 in the conventional manner, A.C. voltage signals $e_d$ and $e_r$ will be produced as defined by the expressions:

$$ke_d(\pm \Delta F_d)\left(\frac{Vo}{Vi}\right) \quad (18)$$

$$ke_r(\pm \Delta F_r)\left(\frac{Vo}{Vi}\right) \quad (19)$$

which, it will be noted, are identical to the Expressions 5 and 6. The basic method of the present invention as well as its application in the well logging method of the present invention will be more evident from a description of the apparatus constructed in accordance with the present invention and illustrated in FIGS. 1 and 2.

Referring now to FIG. 1, a well logging apparatus constructed in accordance with the present invention is indicated generally by the reference numeral 10. A well logging tool 12 has an upper sonde 14 which is vertically spaced from a lower sonde 16. The sonde 14 has a voltage measuring probe 18 and a current measuring probe 20. Similarly, the lower sonde 16 has a voltage measuring probe 22 and a current measuring probe 24. The logging tool 12 is lowered into the well bore by a wire line 26 which passes over an idler drive sheave 28 and is wound around a suitable driven drum (not illustrated). The idler drive sheave 28 is connected by suitable electrical-mechanical or mechanical means represented by the shaft 30 to drive the recording drum 32 and reproducing drum 34 of a time delay device indicated generally by the reference numeral 36, which will hereafter be described in detail. The idler drive sheave 28 is also connected by suitable means, represented by the drive shaft 38, to drive the chart drive drum 40 of a conventional recorder 42 having three recording styluses 44, 46 and 48 for recording electrical signals on a chart as will hereafter be described.

The time delay device 36 has a recording head 50 having two separate recording channels represented by the letters A and B, which is positioned adjacent the recording drum 32 so as to simultaneously record two separate FM signals on an endless tape 52. The endless tape 52 passes by the recording head 50 at a velocity $V_t$ which by reason of the drive shaft 30 will be determined by the velocity at which the logging tool 12 is withdrawn from the well bore, as will hereafter be described. The endless tape 52 passes through a storage area 54 and eventually passes over the reproducing drum 34 and then travels by an erasing head 56 before returning to the recording drum 32. The period of time required for a point on the endless tape 52 to travel from the recording head 50, around the recording drum 32, through the storage area 54 and then around the reproducing drum 34 will obviously be dependent upon both the length of the endless tape 52 and the rate at which the recording and reproducing drums rotate. As the endless tape 52 passes over the reproducing drum 34, it passes a reproducing head 58 having two separate channels, also represented by the reference letters A and B, which correspond to the similarly designated channels of the recording head 50. Therefore, an FM signal recorded by channel A of the recording head 50 will be reproduced on channel A of the reproducing head 58, and an FM signal recorded on channel B of the recording head will be reproduced on channel B of the reproducing head 58.

The measurements of the voltage probe 18 of the upper sonde 14 are encoded on an FM signal which may be defined by the expression $$F_e \pm \Delta F_e \qquad (20)$$

and transmitted through a suitable conductor means 60 to a suitable amplifier 62 and is then recorded by channel A of the recording head 50. Similarly the current measured by the probe 20 of the upper sonde 14 is encoded on an FM signal represented by the expression $$F_i \pm \Delta F_i \qquad (21)$$

and transmitted to the surface through suitable conductor means 64 to an amplifier 66 and then is recorded by channel B of the recording head 50. The FM signals are reproduced on channels A and B, respectively, of the reproducing head 58 after a time delay, as will be hereafter described, and are fed to two similar amplifiers 68 and 70, respectively, which are broadly tuned, as hereafter described in greater detail. The output from the amplifiers 68 and 70 are fed to identical FM detectors 72 and 74. The detectors may be highly sensitive, linear rate meters of conventional design capable of producing an instantaneous D.C. voltage having a magnitude corresponding to the instantaneous frequency of the respective reproduced FM signals from the respective amplifiers 68 and 70. The D.C. signals from the FM detectors 72 and 74 are then fed to A.C. amplifiers 76 and 68, respectively, which amplify only the A.C. components of the D.C. signals from the respective detectors. The outputs from the A.C. amplifiers 76 and 78 are then fed to a ratio detector 80 which in effect divides the signal from the amplifier 78 into the signal from the amplifier 76 to produce an A.C. electrical signal which is proportional to the resistivity of the formation as determined by Ohm's law from the voltage and current measurements made by the sonde 14. The output of the ratio detector 80 is then fed through suitable conductor means 82 to both the recording stylus 48 of the recorder 42 and to an A.C. to D.C. converter 83 before being fed to a second ratio detector 84 for purposes hereafter described.

The voltage measured by the voltage probe 22 and the current measured by the current probe 24 of the lower sonde 16 are encoded on separate FM signals of the same character as described previously which are transmitted upwardly through the well bore by suitable conductor means 86 and 88, respectively, to a dual-channel receiver 90 which demodulates the FM signals in a conventional manner to produce two A.C. signals representative of the analog data carried by the respective signals. The two A.C. signals which are representative of the voltage and current measurements made by the probes 22 and 24, respectively, are then fed to a ratio detector 92 which performs the necessary division in accordance with Ohm's law to produce a signal proportional to the resistance of the formation adjacent the lower sonde 16. The resistance measurement signal is then fed to the recording stylus 44 of the recorder 42, to an A.C. to D.C. converter 93 and to the ratio detector 84 where the resistance measurement signal is divided into the resistance measurement signal from the ratio detector 80 to produce the ratio described in the above referenced patent application. The output from the ratio detector 84 is then fed through suitable conductor means 86 to the stylus 46 of the recorder 42 where it is simultaneously recorded with the signals from the ratio detectors 80 and 92 on a chart 96, as will presently be described.

*Operation of FIG. 1 device*

In order to log a particular well bore, the logging tool 12 is first lowered to the bottom of the well bore (not illustrated) on the wire line 26 to a desired depth. The time delay device 36 and the recorder 42 are then correlated with respect to the particular depth of the logging tool 12 and mechanically engaged to the idler drive sheave 28 by the mechanisms represented by the shafts 30 and 38, respectively. As the upper sonde passes each particular point of the well bore the probes 18 and 20 measure both the voltage imposed on a segment of the formation by a suitable electrode (not shown) carried by the logging tool 12 and another electrode disposed in the earth remote from the well bore, and the resulting current flowing through the formation, respectively. The voltage measurement is encoded on an FM signal which may then be represented by the Expression 20, previously set out, and is transmitted to the surface to channel A of the recording head 50. Similarly, the current measurement will be encoded on an FM signal represented by the Expression 21 and transmitted to channel B of the recording head 50. As previously described, in each expression the F term is representative of the center frequency of the respective FM signal and the magnitude of the ±ΔF term is representative of the analog data which is the measured voltage and current, respectively. The modulation frequencies, or the frequency at which the ±ΔF term changes from positive to negative in both signals will be equal and constant, such as 200 c.p.s., for example, and the two modulation frequencies will be in-phase.

The two FM signals fed to channels A and B of the recording head 50 are then recorded on the endless tape 52 as it passes over the recording drum 32. Since the recording drum 32 and reproducing drum 34 are driven by the idler drive sheave 28, the velocity of the endless tape 52 as it travels past the recording head 50 will be proportional to the speed at which the logging tool 12 is being removed from the well bore, and accordingly will continually be properly oriented with respect to the depth of the sonde 14. Since the movement of the endless tape is synchronized with the withdrawal of the logging tool 12 from the well bore by the drive shaft 30, the tape will always be properly oriented to depth such that after a delay period in the storage area 54 the point on the tape will pass the reproducing head 58 at the same time the lower sonde 16 is passing the corresponding depth in the well bore such that the data from both sondes will be recorded simultaneously as will hereafter be described. The endless tape 52 then passes the erase head 56 before returning to the recording drum 32.

It will be noted that due to the delay in time between recordation and reproduction of the two signals, it is likely that the speed at which the logging tool 12 is withdrawn from the well bore will change, which in turn will change the velocity at which the endless tape 52 passes both the recording and reproducing heads 50 and 58, respectively. Therefore, if as previously stated $Vi$ represents the velocity of the tape 52 during recordation, or the velocity in, and $Vo$ represents the speed of the tape during reproduction, or velocity out, the FM signals reproduced by the reproducing head 58 will be modulated by the velocity factor $Vo/Vi$. Therefore, the output signal from channel A of the reproducing head 58 may be represented by the expression.

$$F_e\left(\frac{Vo}{Vi}\right)\pm\Delta F_e\left(\frac{Vo}{Vi}\right) \quad (22)$$

and the output from channel B of the reproducing head 58 will be represented by the expression $$F_i\left(\frac{Vo}{Vi}\right)\pm\Delta F_i\left(\frac{Vo}{Vi}\right) \quad (23)$$

In nearly all cases the operator of the logging device will be able to maintain a constant speed of withdrawal of the logging tool 12 within ±15 percent such that the velocity factor $Vo/Vi$ will always be greater than 0.85 and less than 1.15. These error limits will prove very useful in the design of the circuitry, as will be evident to those skilled in the art. For example, the tuned amplifiers 68 and 70 should be tuned so as to accept the signals from channels A and B of the reproducing head 58 when the velocity factor is within these error limits. The signals from the amplifiers 68 and 70 as defined by Expressions 22 and 23, respectively, are then fed to FM detectors 72 and 74, respectively. The FM detectors, which are preferably rate meters, must also perform within these frequency limits and produce D.C. voltage signals such as might be represented by the expressions:

$$kE\left[F_e\left(\frac{Vo}{Vi}\right)\right]+ke\left[\pm\Delta F_e\left(\frac{Vo}{Vi}\right)\right] \quad (24)$$

$$kE\left[F_i\left(\frac{Vo}{Vi}\right)\right]+ke\left[\pm\Delta F_i\left(\frac{Vo}{Vi}\right)\right] \quad (25)$$

wherein the $k$E terms represent the D.C. voltages resulting from the center frequency terms $$F_e\left(\frac{Vo}{Vi}\right)$$

and $$F_i\left(\frac{Vo}{Vi}\right)$$

and the $ke$ terms represent A.C. component signals superimposed on the D.C. voltages, and resulting from the $$\pm\Delta F\left(\frac{Vo}{Vi}\right)$$

terms. It will be noted that the $k$E term carries the velocity factor term $Vo/Vi$ which distorts the amplitude of the D.C. signal. The A.C. components $ke$ are distorted by the velocity factor both as to frequency ($f$) and peak voltages, the latter being representative of the encoded data. However, when the direct voltages from the detectors 72 and 74 as represented by the Expressions 24 and 25 are fed to the A.C. amplifiers 76 and 78, respectively, the amplifiers reproduce only the A.C. signal components superimposed on the constant value D.C. signal components, such that the D.C. components are eliminated. Therefore the output from the A.C. amplifiers 76 and 78 may be respectively represented by the expressions $$ke\left[\pm\Delta F_e\left(\frac{Vo}{Vi}\right)\right] \quad (26)$$

$$ke\left[\pm\Delta F_i\left(\frac{Vo}{Vi}\right)\right] \quad (27)$$

It will be noted that the A.C. signals from the amplifiers 76 and 78 are now representative only of the ±ΔF term of each of the original FM signals, modulated by the velocity factor $Vo/Vi$ as to both frequency ($f$) and peak magnitude. However, the frequencies of both A.C. signals are distorted by the same amount and therefore the signals are still in-phase. Thus when the two A.C. signals are fed to the ratio detector 80 such that the A.C. signal represented by Expression 26 is divided by the A.C. signal represented by Expression 27 from the amplifier 78, the velocity factor $Vo/Vi$ will be cancelled from the quotient signal produced by the ratio detector insofar as the peak voltages or magnitudes representative of the encoded data is concerned, although the frequency ($f$) of the quotient ouput signal will continue to be distorted by the velocity factor $Vo/Vi$. However, since the analog data representative of the voltage and current measured by the probes 18 and 20, respectively, was represented only by the magnitude of the frequency deviations $\pm\Delta F_e$ and $\pm\Delta F_i$, respectively, the analog data carried by the quotient output signal from the ratio detector 80 will be free of any distortion due to the differences in the velocities $Vi$ and $Vo$. Further, it will be noted that the voltage measured by the probe 18 will have been divided by the current measured by the probe 20 in accordance with Ohm's law to produce a signal proportional to the resistance of the formation at the point of measurement which, it will be appreciated, at the time of output from the ratio detector will then be opposite the lower sonde 16, as will presently be described. Therefore the output from the ratio detector 80 can be represented by the expression:

$$ke_r\left[f\left(\frac{Vo}{Vi}\right)\right] \quad (28)$$

wherein the subscript $r$ refers to resistance and the subscript $f(Vo/Vi)$ represents the frequency of the signal which is distorted by the velocity factor.

The output from the ratio detector 80 is then fed directly to the stylus 48 of the recorder 42 for recordation on the chart 96. The output signal from the ratio detector 80 is also fed to the converter 83 which converts the A.C. signal to a D.C. signal and then feeds the D.C. signal to the ratio detector 84.

The voltage and current measurements made by the probes 22 and 24 of the lower sonde 16 are transmitted to the dual-channel receiver 90 as analog data encoded on FM signals of the same general character as the FM signals sent to the recording head 50. The dual-channel receiver 90 demodulates the two FM signals and preferably produces two A.C. signals the peak voltages of which represent the voltage and current data carried by the respective FM signals and preferably having the same frequencies as the frequency modulations ±ΔF of the two FM signals from the upper sonde 14 and fed to the recording head 50. The ratio detector 92 then performs the necessary division of the voltage and current signals in accordance with Ohm's law to produce an A.C. signal of the same frequency having a magnitude proportional to the resistivity of the formation adjacent the sonde 16. The A.C. signal from the ratio detector 92 is fed simultaneously to the stylus 44 for recordation on the chart 96 and to the converter 93, which converts the A.C. signal to a D.C. signal proportional to the peak voltages of the A.C. signal. The D.C. output signal from the converter 93 is then fed to the ratio detector 84. It will be appreciated that the converters 83 and 93 are required because the frequency ($f$) of the A.C. resistance signal from the ratio detector 80 is modified by the voltage factor $Vo/Vi$ and may not be in-phase with the constant frequency A.C. resistance signal from the ratio detector 92. The ratio detector 84 then produces a signal from the two D.C. signals which is proportional to the desired ratio of the resistance of the formation remote from the well bore to the resistance of the formation in close proximity to the well bore, in accordance with the teachings of the above referenced patent application. This ratio output from the ratio detector 84 is then recorded by the stylus 46 on the chart 96.

In this regard, it will be noted that due to the fact that the signal recorded by the stylus 48 was delayed by recordation upon the endless tape 52 for the period of time required for the lower sonde 16 to travel upwardly to the position of the upper sonde 14 at the instant of the resistivity measurements, the data recorded by each of the three styluses 44, 46 and 48 on the chart 96 will be correlated with respect to depth in the well bore.

Referring now to FIG. 2, another device constructed in accordance with the present invention for logging a well bore is indicated generally by the reference numeral 100. The device 100 is substantially identical to the device 10 except for the circuitry for demodulating the reproduced FM data signals. Accordingly, all components which are of identical construction are designated by the same reference numeral and only those components which differ will now be described.

The time delay device 36 is altered in that two additional channels, represented by the letters C and D, have been added to the recording head 50. Two corresponding channels C and D have been added to the reproducing head 58. An oscillator 102 for producing the center frequency $F_e$ of the FM signal from the amplifier 62 as defined by the Expression 20 is connected to the channel C of the recording head 50. A similar oscillator 104 for producing a signal having a center frequency $F_i$ equal to the center frquency $F_i$ of the FM signal from the amplifier 66 as defined by the Expression 21 is connected to channel D of the recording head 50. Therefore the four FM signals fed to the channels A, B, C and D of the recording head 50 are recorded simultaneously on the endless tape 52. After a time delay, as previously described in connection with the device 10, the four signals are reproduced on the corresponding channels A, B, C and D, respectively, of the reproducing head 58.

The output from the four channels of the reproducing head are fed through tuned amplifiers 106, 108, 110 and 112, respectively. The amplifiers are relatively broadly tuned so as to accept the respective FM signals as modulated by the velocity factor *Vo/Vi* when the velocity factor is greater than 0.85 and less than 1.15, as previously described. The outputs from the amplifiers 106 and 108 may be represented by the expressions:

$$F_e\left(\frac{Vo}{Vi}\right)\pm\Delta F_e\left(\frac{Vo}{Vi}\right) \qquad (29)$$

$$F_i\left(\frac{Vo}{Vi}\right)\pm\Delta F_i\left(\frac{Vo}{Vi}\right) \qquad (30)$$

and the outputs are fed to heterodyne mixers 114 and 116. A second pair of oscillators 118 and 119 each produce constant frequency signals $F_1$ and $F_2$ which are also fed to the heterodyne mixers 114 and 116. The beat frequency outputs from the heterodyne mixers 114 and 116 are fed to tuned amplifiers 120 and 121 which are tuned to pass only the sum beat frequency of the two signals fed to the respective mixers. Therefore, the sum beat frequencies which are passed through the tuned amplifiers 120 and 121 may be represented, respectively, by the expressions:

$$F_1+F_e\left(\frac{Vo}{Vi}\right)\pm\Delta F_e\left(\frac{Vo}{Vi}\right) \qquad (31)$$

$$F_2+F_i\left(\frac{Vo}{Vi}\right)\pm\Delta F_i\left(\frac{Vo}{Vi}\right) \qquad (32)$$

The sum beat Frequencies 31 and 32 are fed to a second pair of heterodyne mixers 122 and 124. The output signals from the amplifiers 110 and 112 are equal to the center frequencies $F_e$ and $F_i$ from the oscillators 102 and 104 as modulated by the velocity factor *Vo/Vi* and accordingly can be represented by the expressions $$F_e\left(\frac{Vo}{Vi}\right) \qquad (33)$$

$$F_i\left(\frac{Vo}{Vi}\right) \qquad (34)$$

The Output Signals 33 and 34 from the amplifiers 110 and 112, respectively, are then fed to the heterodyne mixers 122 and 124 and mixed with the sum beat frequency outputs. The outputs from the heterodyne mixers 122 and 124 are then fed to tuned amplifiers 126 and 128 which pass only the difference beat frequencies such that the output signals from the respective amplifiers may be represented by the expressions:

$$F_1+F_e\left(\frac{Vo}{Vi}\right)\pm\Delta F_e\left(\frac{Vo}{Vi}\right)-F_e\left(\frac{Vo}{Vi}\right)=F_1\pm\Delta F_e\left(\frac{Vo}{Vi}\right) \qquad (35)$$

$$F_2+F_i\left(\frac{Vo}{Vi}\right)\pm\Delta F_i\left(\frac{Vo}{Vi}\right)-F_i\left(\frac{Vo}{Vi}\right)=F_2\pm\Delta F_i\left(\frac{Va}{Vi}\right) \qquad (36)$$

Thus it will be noted that the center frequency term F as modulated by the velocity factor *Vo/Vi* has been eliminated from both signals.

The output signals from the amplifiers 126 and 128 as represented by the Expressions 35 and 36 are then fed to FM demodulators 130 and 132. The demodulators 130 and 132 convert the FM signals to A.C. signals the peak voltages of which are proportional to the maximum excursions ±ΔF from the center frequency F of the respective FM signals and having frequencies (*f*) corresponding to the rate at which the ±ΔF terms change between positive and negative. Therefore, the demodulated outputs from the demodulators 130 and 132 may be represented, respectively, by the expressions $$ke_e\left[\pm\Delta F_e\left(\frac{Vo}{Vi}\right)\right] \qquad (37)$$

$$ke_i\left[\pm\Delta F_i\left(\frac{Vo}{Vi}\right)\right] \qquad (38)$$

It will be noted that both of the A.C. signals $e_e$ and $e_i$ will have peak amplitudes which are distorted by the velocity factor *Vo/Vi* and also frequencies (*f*) which are distorted by the velocity factor *Vo/Vi*. Therefore, the two A.C. signals will be in-phase and when fed to a ratio detector 134 will produce an A.C. signal of the same frequency but having a magnitude proportional to the ratio of the signal from the demodulator 130 as represented by the Expression 37 divided by the signal from the demodulator 132 as represented by the Expression 38. Thus the output A.C. signal from the ratio detector 134 can be represented by the expression $$ke_r\left[f\left(\frac{Vo}{Vi}\right)\right] \qquad (39)$$

wherein the subscript *r* designates that the output signal from the ratio detector 134 is proportional to the resistance of the formation as a result of the division of the measured voltage by the measured current. Further, it is intended to denote that the peak voltage of the output resistance signal $e_r$ is free from distortion due to the velocity factor *Vo/Vi*, but that the frequency (*f*) of the signal is distorted by the velocity factor. It will be noted that the output signal from the detector 134 of the device 100 is substantially identical to the output from the detector 80 of the device 10, and will have been delayed to the same extent. Therefore the resistance output signal from the ratio detector 134 will be applied to the stylus 48 and to the converter 83, and the ratio detector 84 in proper synchronism with the resistance measurement signal from the lower sonde 16 such that the three traces produced on the chart 96 by the styluses 44, 46 and 48 will be accurately oriented with respect to the same depth in the well bore.

From the above detailed descriptions, it will be evident to those skilled in the art that a novel method for recording and reproducing an FM data signal without distortion of data carried by the signal has been disclosed. Further, a method and apparatus has been described for logging a well bore by means of a logging tool having two vertically spaced sondes wherein voltage and measurement signals from the upper sonde are delayed for the necessary period of time to provide depth correlation, and then are demodulated and divided to both produce a resistance measurement and eliminate any distortion of the measurements due to changes in recording velocities over the time delay period. It will be evident that the recorded FM signals can be delayed for a variable period of time merely by changing the velocity of the endless tape 52. Then so long as the velocity of the tape 52 during reproduction is within the particular ±15 percent design margin, the reproduced FM signals can be handled by the demodulation equipment. While the demodulation components of the device 100 of FIG. 2 may appear to be more complicated, the demodulation circuitry of the device 100 will in many instances be preferred because all of the components can be standard FM components.

It will be noted from the description of the devices 10 and 100 that by selecting certain components of the devices, the devices can be used for merely recording and reproducing a single FM data signal. The only components necessary to perform this operation are the recording and reproducing heads 50 and 58, a recording medium, an oscillator means for producing an FM reference signal of constant unitary value, which oscillator means would correspond to the probe 20 of the sonde 14, the demodulation circuits of either FIG. 1 or 2, and the ratio detector. The device can be used for delaying a single FM data signal merely by making the record medium endless, as disclosed in the drawings. Further, the time delay period can be made variable over a relatively wide range without changing the length of the endless tape merely by varying the speed at which the tape is driven.

Having thus described several preferred embodiments of the present invention, it is to be understood that various changes, substitutions and alterations can be made in the steps of the methods and the components and combinations of the components of the devices without departing from the spirit and scope of the present invention as defined by the appended claims.

What is claimed is:

1. A method for recording and reproducing an FM data signal without distortion of the data due to variations in the velocities of the recording and playback device comprising the steps of:

simultaneously recording the FM data signal and an FM reference signal by moving a recording medium past a pair of recording heads at a first velocity $Vi$;

simultaneously reproducing the FM data signal and the FM reference signal by moving the recording medium past a pair of reproducing heads at a second velocity $Vo$ such that the frequencies of the FM data signal and FM reference signal will be multiplied by the velocity factor $Vo/Vi$;

demodulating the reproduced FM data signal to produce a demodulated electrical singal representative of the data carried by the FM data signal multiplied by the velocity factor $Vo/Vi$;

demodulating the reproduced FM reference signal to produce a similar demodulated electrical signal representative of the FM reference signal multiplied by the velocity factor $Vo/Vi$; and, dividing one of the demodulated signals by the other demodulated signal to eliminate the velocity factor and thereby provide an electrical signal proportional to the data carried by the FM data signal.

2. A method for recording and reproducing an FM data signal without distortion of the data due to variations in the velocities of the recording and playback device comprising the steps defined in claim 1 wherein both the FM data signal and the FM reference signal are demodulated by the steps of:

producing a direct current signal having an instantaneous value corresponding to the instantaneous frequency of the respective FM signal and thereby varying in accordance with the data carried by the respective FM signal multiplied by the velocity factor $Vo/Vi$; and, converting the direct current signal to an alternating current signal corresponding to the variations in the direct current signal whereby peak magnitude of the alternating current signal will be representative of the data carried by the respective signal multiplied by the velocity factor $Vo/Vi$ and the alternating current signal will be the demodulated FM signal.

3. A method for recording and reproducing an FM data signal without distortion of the data due to variations in the velocities of the recording and playback device as defined in claim 1 further characterized by the steps of:

recording first and second signals having frequencies corresponding to the center frequencies of the FM data signal and the FM reference signal, respectively, in synchronism with the recordation of the FM data and FM reference signals by simultaneously moving a second recording medium past a second pair of recording heads at the velocity $Vi$;

reproducing the first and second carrier signals in synchronism with the FM data and FM reference signals by moving the second recording medium past a second pair of reproducing heads at a velocity $Vo$ such that the frequencies of the reproduced first and second signals will be modulated by the velocity factor $Vo/Vi$;

demodulating the reproduced FM data signal by mixing a third signal having a constant frequency with the reproduced FM data signal to produce a first mixed signal, filtering the sum beat frequency from the first mixed signal to produce a first sum beat frequency signal, mixing the first sum beat frequency signal with the reproduced first signal to produce a second mixed signal, filtering the difference beat frequency from the second mixed signal to produce a second difference beat frequency signal, and demodulating the second difference beat frequency signal to produce the demodulated signal representative of the data carried by the FM data signal multiplied by the velocity factor $Vo/Vi$; and, demodulating the reproduced FM reference signal by mixing a fourth signal having a constant frequency with the produced FM reference signal to produce a third mixed signal, filtering the sum beat frequency from the third mixed signal to produce a third sum beat frequency signal, mixing the third sum beat frequency signal with the reproduced second signal to produce a fourth mixed signal, filtering the difference beat frequency from the fourth mixed signal to produce a fourth difference beat frequency signal, and demodulating the fourth difference beat frequency signal to produce the demodulated signal representative of the data carried by the FM reference signal multiplied by the velocity factor $Vo/Vi$.

4. A method for recording and reproducing an FM data signal having a center frequency $F_d$ and modulations $\pm\Delta F_d$ representative of analog data without distortion of the data due to variations in the velocities of the recording and reproducing device, the method comprising the steps of:

simultaneously recording the FM data signal, an FM reference signal having a center frequency $F_r$ and constant magnitude modulations $\pm\Delta F_r$ representative of a unit value, a first center frequency signal having a constant frequency $F_d$, and a second center frequency signal having a constant frequency $F_r$ on a recording medium by moving the recording medium past a set of recording heads at a velocity $Vi$;

simultaneously reproducing the FM data signal, the FM reference signal, and the first and second center frequency signals by moving the recording medium past a set of reproducing heads at a velocity $Vo$ such that the reproduced signals will have frequencies equal to the frequencies of the recorded signals multiplied by the velocity factor $Vo/Vi$;

mixing the reproduced FM data signal with a third signal having a frequency $F_3$ to produce a first mixed signal having a sum beat frequency $$F_3+F_d\left(\frac{Vo}{Vi}\right)\pm\Delta F_d\left(\frac{Vo}{Vi}\right)$$

mixing the first mixed signal with the reproduced first center frequency signal to produce a second mixed signal having a difference beat frequency $$F_3\pm\Delta F_d\left(\frac{Vo}{Vi}\right)$$

demodulating the second mixed signal to produce a first demodulated signal representative of the frequency $$\pm\Delta F_d\left(\frac{Vo}{Vi}\right)$$

and therefore of the analog data;

mixing the reproduced FM reference signal with a fourth signal having a frequency $F_4$ so as to produce a third mixed signal having a sum beat frequency $$F_4+F_r\left(\frac{Vo}{Vi}\right)\pm\Delta F_r\left(\frac{Vo}{Vi}\right)$$

mixing the third mixed signal with the reproduced second center frequency signal to produce a fourth mixed signal having a difference beat frequency $$F_4\pm\Delta F_r\left(\frac{Vo}{Vi}\right)$$

demodulating the fourth mixed signal to produce a second demodulated signal representative of the frequency $$\pm\Delta F_r\left(\frac{Vo}{Vi}\right)$$

and therefore of the unit value; and, determining the ratio between the first and second demodulated signals by dividing the one demodulated signal into the other to eliminate the velocity factor $Vo/Vi$ and produce a signal representative of the original analog data carried by the data signal.

5. A method for recording and reproducing an FM data signal having a center frequency $F_d$ and modulations $\pm\Delta F_d$ representative of analog data without distortion of the data due to variations in the velocities of the recording and reproducing device, the method comprising the steps of:

simultaneously recording the FM data signal and an FM reference signal having a center frequency $F_r$ and constant magnitude modulations $\pm\Delta F_r$ representative of a unit value on a recording medium by moving the recording medium past a set of recording heads at a velocity $Vi$;

simultaneously reproducing the FM data signal and the FM reference signal by moving the recording medium past a set of reproducing heads at a velocity $Vo$ such that the reproduced signals will have frequencies equal to the frequencies of the recorded signals multiplied by the velocity factor $Vo/Vi$;

demodulating the reproduced FM data signal to produce a first D.C. signal having an instantaneous value representative of the instantaneous frequency of the reproduced FM data signal;

converting the first D.C. signal into a first A.C. signal representative of the variations in the D.C. signal;

demodulating the reproduced FM reference signal to produce a second D.C. signal having an instantaneous value representative of the instantaneous frequency of the reproduced FM reference signal;

converting the second D.C. signal into a second A.C. signal representative of the variations in the D.C. signal; and, determining the ratio between the first and second A.C. signals by dividing the one A.C. signal into the other whereby the velocity factor $Vo/Vi$ will be eliminated.

6. A method of well logging using a logging tool having a pair of vertically spaced sondes, the leading sonde during the logging run having means for encoding data on an FM data signal, the method comprising the steps of:

transmitting data from both the upper and lower sondes to the surface as the logging tool is moved through the well bore during a logging run, the data from the leading sonde being encoded on an FM data signal;

simultaneously recording the FM data signal and an FM reference signal by moving a recording medium past a pair of recording heads at a velocity $Vi$ and in synchronism with the movement of the logging tool through the well bore;

simultaneously reproducing the FM data signal and the FM reference signal by moving the recording medium past a pair of reproducing heads at a velocity $Vo$ and in synchronism with the movement of the logging tool through the well bore and after a time delay synchronized with the movement of the logging tool through the well bore a distance equal to the distance between the vertically spaced sondes such that the frequencies of the reproduced FM signals will be modulated by the velocity factor $Vo/Vi$;

demodulating each of the reproduced FM signals to produce similar demodulated electrical signals representative of the data carried by the respective signals multiplied by the velocity factor $Vo/Vi$;

dividing one of the demodulated signals by the other demodulated signal to eliminate the velocity factor distortion from the data and thereby provide a decoded electrical signal proportional to the data carried by the FM data signal; and, simultaneously recording both the decoded electrical signal and the data transmitted from the other sonde on record means such that the data can be correlated to the depth from which the data was transmitted.

7. A method of well logging using a logging tool having a pair of vertically spaced sondes, the leading sonde during the logging run having means for encoding data on an FM data signal, the method comprising the steps as defined in claim 6 wherein both the FM data signal and the FM reference signal are demodulated by the steps of:

producing a direct current signal having an instantaneous value corresponding to the instantaneous frequency of the respective FM signal and thereby varying in accordance with the data carried by the respective FM signals multiplied by the velocity factor $Vo/Vi$; and, converting the direct current signal to an alternating current signal corresponding to the variations in the direct current signal whereby the peak magnitude of the alternating current signal will be representative of the data carried by the respective signals multiplied by the velocity factor $Vo/Vi$.

8. A method of well logging using a logging tool having a pair of vertically spaced sondes, the leading sonde during the logging run having means for encoding data on an FM data signal, the method comprising the steps as defined in claim 6 wherein both the FM data signal and the FM reference signal are demodulated by the steps of:

recording first and second signals having frequencies corresponding to the center frequencies of the FM data signal and the FM reference signal, respectively, in synchronism with the recordation of the FM data and FM reference signals by simultaneously moving a second recording medium past a second pair of recording heads at the velocity $Vi$;

reproducing the first and second carrier signals in synchronism with the FM data and FM reference signals by moving the second recording medium past a second pair of reproducing heads at a velocity $Vo$ such that the frequencies of the reproduced first and second signals will be modulated by the velocity factor $Vo/Vi$;

demodulating the reproduced FM data signal by mixing a third signal having a constant frequency with the reproduced FM data signal to produce a first mixed signal, filtering the sum beat frequency from the first mixed signal to produce a first sum beat frequency signal, mixing the first sum beat frequency signal with the reproduced first signal to produce a second mixed signal, filtering the difference beat frequency from the second mixed signal to produce a second difference beat frequency signal, and demodulating the second difference beat frequency signal to produce the demodulated signal representative of the data carried by the FM data signal multiplied by the velocity factor $Vo/Vi$; and, demodulating the reproduced FM reference signal by mixing a fourth signal having a constant frequency with the reproduced FM reference signal to produce a third mixed signal, filtering the sum beat frequency from the third mixed signal to produce a third sum beat frequency signal, mixing the third sum beat frequency signal with the reproduced second signal to produce a fourth mixed signal, filtering the difference beat frequency from the fourth mixed signal to produce a fourth difference beat frequency signal, and demodulating the fourth difference beat frequency signal to produce the demodulated signal representative of the data carried by the FM reference signal multiplied by the velocity factor $Vo/Vi$.

9. A method of well logging using a logging tool having a pair of vertically spaced sondes, the leading sonde during the logging run having means for measuring the voltage impressed on the formation adjacent the well bore and encoding the measured voltage on an FM voltage signal and means for measuring the current in the formation adjacent the well bore and encoding the measured current on an FM current signal, the method comprising the steps of:

transmitting data from both of the vertically spaced sondes as the logging tool is moved through the well bore, the data from the leading sonde including an FM voltage signal and an FM current signal;

simultaneously recording the FM voltage and FM current signals by moving a recording medium past a pair of recording heads at a velocity $Vi$ and in synchronism with the movement of the logging tool through the well bore;

simultaneously reproducing the FM data signal and the FM reference signal by moving the recording medium past a pair of reproducing heads at a velocity $Vo$ and in synchronism with the movement of the logging tool through the well bore and after a time delay synchronized with the movement of the logging tool through the well bore a distance equal to the distance between the vertically spaced sondes, whereby the frequencies of the reproduced FM signals will be modulated by the velocity factor $Vo/Vi$;

demodulating the reproduced FM voltage signal and the reproduced FM current signal to produce similar demodulated voltage and current signals representative of the data carried by the respective signals multiplied by the velocity factor $Vo/Vi$;

dividing the demodulated voltage signal by the demodulated current signal to simultaneously eliminate the velocity factor distortion from the data carried by each signal and produce a decoded resistance signal representative of the resistance of the formation as measured by Ohm's law; and, simultaneously recording both the decoded resistance signal and the data transmitted from the other sonde on recording means such that the data can be correlated to the depth from which the data was transmitted.

10. A method of well logging comprising the steps as defined in claim 9 wherein the reproduced FM voltage signal and the reproduced FM current signal are demodulated by the steps of:

producing a direct current signal having an instantaneous value corresponding to the instantaneous frequency of the respective FM signal and thereby varying in accordance with the data carried by the respective FM signals multiplied by the velocity factor $Vo/Vi$; and, converting the direct current signal to an alternating current signal corresponding to the variations in the direct current signal whereby the peak magnitude of the alternating current signal will be representative of the data carried by the respective signals multiplied by the velocity factor $Vo/Vi$.

11. A method of well logging comprising the steps as defined in claim 9 wherein the reproduced FM voltage signal and the reproduced FM current signal are demodulated by the steps of:

recording first and second signals having frequencies corresponding to the center frequencies of the FM data signal and the FM reference signal, respectively, in synchronism with the recordation of the FM data and FM reference signals by simultaneously moving a second recording medium past a second pair of recording heads at the velocity $Vi$;

reproducing the first and second carrier signals in synchronism with the FM data and FM reference signals by moving the second recording medium past a second pair of reproducing heads at a velocity $Vo$ such that the frequencies of the reproduced first and second signals will be modulated by the velocity factor $Vo/Vi$;

demodulating the reproduced FM data signal by mixing a third signal having a constant frequency with the reproduced FM data signal to produce a first mixed signal, filtering the sum beat frequency from the first mixed signal to produce a first sum beat frequency signal, mixing the first sum beat frequency signal with the reproduced first signal to produce a second mixed signal, filtering the difference beat frequency from the second mixed signal to produce a second difference beat frequency signal, and demodulating the second difference beat frequency signal to produce the demodulated signal representative of the data carried by the FM data signal multiplied by the velocity factor $Vo/Vi$; and, demodulating the reproduced FM reference signal by mixing a fourth signal having a constant frequency with the reproduced FM reference signal to produce a third mixed signal, filtering the sum beat frequency from the third mixed signal to produce a third sum beat frequency signal, mixing the third sum beat frequency signal with the reproduced second signal to produce a fourth mixed signal, filtering the difference beat between frequency from the fourth mixed signal to produce a fourth difference beat frequency signal, and demodulating the fourth difference beat frequency signal to produce the demodulated signal representative of the data carried by the FM reference signal multiplied by the velocity factor $Vo/Vi$.

12. A device for logging a well bore comprising, in combination:

a logging tool having vertically spaced upper and lower sondes, each sonde having means for measuring at least one condition in the well bore and encoding the measurements on an electrical signal for transmission to the surface, the electrical signal from the leading snode being an FM data signal having the measurement data encoded thereon as frequency variations about a center frequency;

means for moving the logging tool through the well bore on a logging run;

means for generating an FM reference signal of unit magnitude;

recording and reproducing means having a recording head with at least two recording channels connected to receive the FM data signal and FM reference signal, a reproducing head with a corresponding number of reproducing channels, an endless recording medium successively passing the recording head and the reproducing head, and means operatively connected to the means for moving the logging tool through the well bore and to the endless recording medium for driving the endless recording medium in synchronism with the movement of the logging tool through the well bore;

demodulation circuit means connected to each of the reproducing channels for demodulating the FM data signal and the FM reference signal and producing a demodulated data signal and a demodulated reference signal;

ratio detector means operatively connected to each of the demodulation circuit means for detecting the ratio between the two demodulated signals produced by the respective circuits and producing a decoded signal proportional to the ratio and therefore proportional to the data encoded on the FM data signal;

decoding means operatively connected to receive the signal transmitted from the trailing sonde and producing a second decoded signal representative of the data carried by the signal;

second recording means connected to the ratio detector and to the decoding means for simultaneously recording the two decoded signals; and, means operatively interconnecting the second recording means and the means for moving the logging tool through the well bore for driving the second recording means in synchronism with the movement of the logging tool through the well bore.

13. A device for logging a well bore comprising, in combination:

a logging tool having vertically spaced upper and lower sondes one of which comprises the leading sonde during a logging run and the other the trailing sonde, the leading sonde having means for measuring the voltage impressed across the formation adjacent the well bore and the current resulting from the voltage and encoding the measurements on an FM voltage signal and an FM current signal, respectively, and means for transmitting the signals to the surface, and the trailing sonde having means for making at least one measurement and encoding the measurement on a signal and transmitting the signal to the surface;

means for moving the logging tool through the well bore on a logging run;

recording and reproducing means having a recording head having at least two recording channels operatively connected to receive the FM voltage signal and the FM current signal, respectively, a reproducing head having a corresponding number of reproducing channels, an endless recording medium successively passing the recording head and the reproducing head, and means operatively connected to the means for moving the logging tool through the well bore and to the endless recording medium for driving the endless recording medium in synchronism with the movement of the logging tool through the well bore;

demodulation circuit means connected to each of the reproducing channels for demodulating the FM voltage signal and the FM current signal and producing a demodulated voltage signal and a demodulated current signal;

ratio detector means operatively connected to each of the demodulation circuit means for detecting the ratio between the two demodulated signals produced by the respective circuits and producing resistance signals proportional to the resistance of the formation as determined by Ohm's law from the voltage and current measurements;

decoding means operatively connected to receive the signal transmitted from the trailing sonde and producing a second decoded signal representative of the data carried by the signal;

second recording means operatively connected to the ratio detector and to the decoding means for simultaneously recording the resistance signal and the decoded signal; and, means operatively interconnecting the second recording means and the means for moving the logging tool through the well bore for driving the second recording means in synchronism with the movement of the logging tool through the well bore.

14. A device for logging a well bore comprising the combination as defined in claim 13 wherein:

each of the demodulation circuit means comprises an FM detector for producing a D.C. signal having an instantaneous voltage proportional to the instantaneous frequency of the respective reproduced signals, and an A.C. amplifier operatively connected to the FM detector for passing only the voltage variations in the D.C. signal to produce the demodulated signal.

15. A device for logging a well bore comprising the combination as defined in claim 13 further characterized by:

first oscillator means for producing a first center frequency signal having a frequency equal to the center frequency of the FM voltage signal;

second oscillator means for producing a second center frequency signal having a frequency equal to the center frequency of the FM current signal;

and wherein:

the recording head has at least four recording channels, and two of the channels are operatively connected to the first and second oscillator means for recording the first and second center frequency signals, respectively, on the recording medium; and, the demodulation circuit means comprise third and fourth oscillator means for producing third and fourth signals, respectively, having constant frequencies;

first and second mixer means operatively connected to the reproducing head and to the third and fourth oscillator means for mixing the FM voltage signal with the third signal and the FM current signal with the fourth signal, respectively, to produce first and second mixed signals;

first and second filter means operatively connected to the first and second mixer means, respectively, for filtering the sum beat frequency from the first and second mixed signals and producing first and second sum beat frequency signals;

third and fourth mixer means operatively connected to the first and second filter means and to the reproducing head for mixing the first and second sum beat frequency signals with the first and secnd center frequency signals, respectively, reproduced by the reproducing head to produce third and fourth mixed signals, respectively;

third and fourth filter means operatively connected to the third and fourth mixer means, respectively, for filtering the difference beat frequency from the third and fourth mixed signals and producing first and second difference beat freqeuncy signals, respectively; and, first and second demodulator means operatively connected to the third and fourth filter means, respectively, for demodulating the first and second difference beat frequency signals, respectively.

16. A device for delaying an FM data signal without distortion of analog data encoded thereon, the device comprising:

first oscillator means for producing an FM reference signal;

recording and reprducing means having a recording head with at least two recording channels connected to receive the FM data signal and the FM reference signal on separate channels, a reproducing head having a corresponding number of reproducing channels, an endless recording medium successively passing adjacent the recording head and the reproducing head whereby the signals applied to the recording head will be recorded on the recording medium by the recording head and then reproduced by the reproducing head, and drive means for moving the recording medium past the recording and reproducing heads;

demodulation circuit means connected to each of the reproducing channels for demodulating the reproduced FM data signal and the reproduced FM reference signal and producing a demodulated data signal and a demodulated reference signal; and, ratio detector means operatively connected to the demodulation circuit means for detecting the ratio between the demodulated data and reference signals and producing a quotient signal proportional to the analog data on the FM data signal.

17. A device for delaying an FM data signal without distortion of analog data encoded thereon, the device comprising the combination as defined in claim 16 wherein:

the demodulation circuit means connected to each of the reproducing channels compirses an FM detector for producing D.C. signal having an instantaneous voltage proportional to the instantaneous frequency of the respective reproduced signals, and an A.C. amplifier operatively connected to the FM detector for passing only the voltage variations in the D.C. signal to produce the demodulated signal.

18. A device for delaying an FM data signal without distortion of analog data encoded thereon, the device comprising the combination as defined in claim 16 further characterized by:

first oscillator means for producing a first center frequency signal having a frequency equal to the center frequency of the FM data signal, the first oscillator means being operatively connected to one of the recording channels;

second oscillator means for producing a second center frequency signal having a frequency equal to the center frequency of the FM reference signal, the second oscillator means being operatively connected to another of the recording channels; and, wherein the recording head has at least four recording channels and two of the channels are operatively connected to the first and second oscillator means for recording the first and second center frequency signals, respectively, on the recording medium; and wherein the demodualtion circuit means comprise:

third and fourth oscillator means for producing third and fourth signals, respectively, having constant frequencies, first and second mixer means operatively connected to the reproducing heads and to the third and fourth oscillator means for mixing the FM data signal with the third signal and the FM reference signal with the fourth signal, respectively, to produce first and second mixed signals, first and second filter means operatively connected to the first and second mixer means, respectively, for filtering the sum beat frequency from the first and second mixed signals and producing first and second sum beat frequency signals, third and fourth mixer means operatively connected to the first and second filter means and to the reproducing head for mixing the first and second sum beat frequency signals with the first and second center frequency signals, respectively, reproduced by the reproducing head to produce third and fourth mixed signals, respectively, third and fourth filter means operatively connected to the third and fourth mixer means, respectively, for filtering the difference beat frequency from the third and fourth mixed signals and producing first and second difference beat frequency sigals, respectively, and, first and second demodulator means operatively connected to the third and fourth filter means, respectively, for demodulating the first and second difference beat freqeuncy signals, respectively.

References Cited by the Examiner

UNITED STATES PATENTS

| | | | |
|---|---|---|---|
| 2,436,503 | 2/1948 | Cleveland | 324—1 X |
| 2,573,133 | 10/1951 | Greer | 324—1 |
| 2,620,890 | 12/1952 | Lee et al. | 340—18 X |
| 2,685,079 | 7/1954 | Hoeppner | 179—100.2 X |
| 2,712,609 | 7/1955 | Herzog et al. | |
| 2,794,954 | 6/1957 | Bischoff | 324—79 |
| 2,807,797 | 12/1957 | Shoemaker. | |
| 3,075,142 | 1/1963 | Albright et al. | 324—1 |
| 3,181,057 | 4/1965 | Bravenec | 324—6 X |

WALTER L. CARLSON, *Primary Examiner.*

G. R. STRECKER, *Assistant Examiner.*